(12) United States Patent
Matsuda et al.

(10) Patent No.: US 6,751,107 B2
(45) Date of Patent: Jun. 15, 2004

(54) DC POWER SUPPLY DEVICE WITH CONSTANT POWER OUTPUT LEVEL

(75) Inventors: Yoshiaki Matsuda, Saitama (JP); Shinya Ofuji, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/106,324

(22) Filed: Mar. 27, 2002

(65) Prior Publication Data

US 2003/0185026 A1 Oct. 2, 2003

(51) Int. Cl.$^7$ ................................................ H02M 3/22
(52) U.S. Cl. ................................................ 363/71; 363/67
(58) Field of Search ........................ 363/65, 67–71, 363/93

(56) References Cited

U.S. PATENT DOCUMENTS

| | | | | |
|---|---|---|---|---|
| 5,416,364 A | * | 5/1995 | Divjak | 327/535 |
| 6,118,679 A | * | 9/2000 | Smith | 363/70 |
| 6,370,047 B1 | * | 4/2002 | Mallory | 363/65 |

FOREIGN PATENT DOCUMENTS

JP 2001-128452 5/2001

* cited by examiner

Primary Examiner—Michael Sherry
Assistant Examiner—Gary L. Laxton
(74) Attorney, Agent, or Firm—Armstrong, Kratz, Quintos, Hanson & Brooks, LLP.

(57) ABSTRACT

A DC power supply device includes transformers that operate with an enhanced efficiency and can reduce the factors that generate ripples in the output voltage to make it possible to downsize the transformers and the smoothing filters of the device, reduce the loss attributable to the switching elements during its constant power output operation and also downsize the heat sink fins so that the overall dimensions of the power supply device may be reduced. The DC power supply device also comprises a pair of switching changers, two output transformers and two rectifying/smoothing sections for rectifying the respective outputs of the switching changers. Each of the two switching changers has the same switching cycle period and the striking phases of the switching elements of one of the switching changers and those of the switching elements of the other switching changer are made variable. Then, a constant power output level is achieved by utilizing the difference of the striking phases of the two switching changers in order to isolate the switching changers from each other for operation and connect them in series or in parallel for operation.

20 Claims, 20 Drawing Sheets

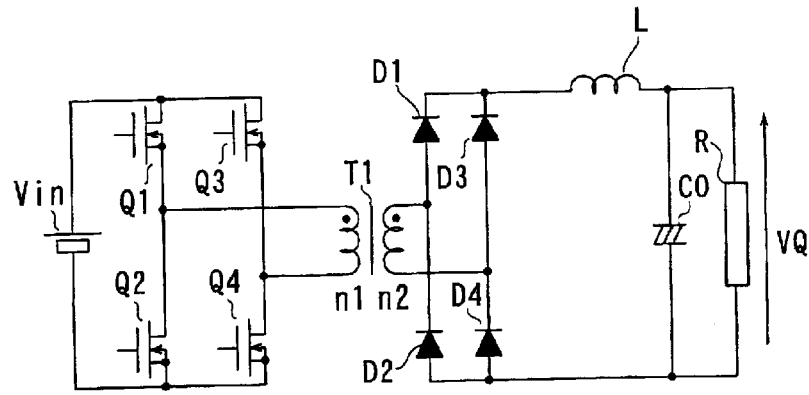
*Fig. 19* PRIOR ART
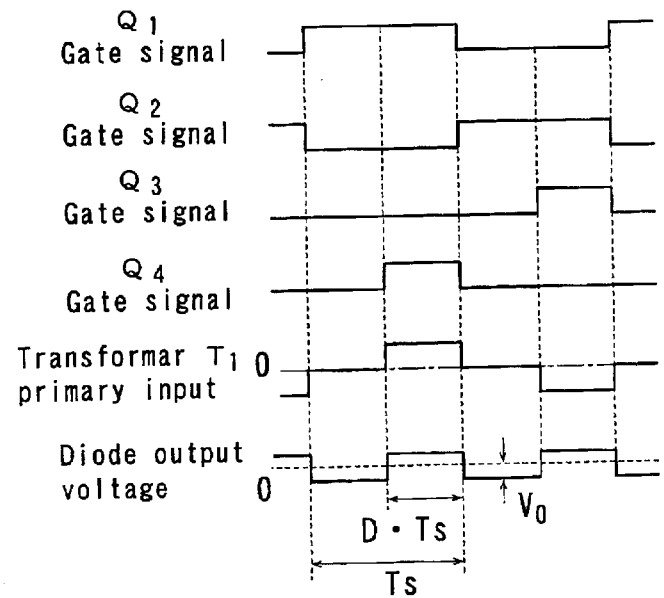
*Fig. 20a* PRIOR ART
*Fig. 20b* PRIOR ART
*Fig. 20c* PRIOR ART
*Fig. 20d* PRIOR ART
*Fig. 20e* PRIOR ART
*Fig. 20f* PRIOR ART

DC POWER SUPPLY DEVICE WITH CONSTANT POWER OUTPUT LEVEL

BACKGROUND OF THE INVENTION

1. Field of the Invention

This invention relate to a switching power supply device. More particularly, it relates to a DC power supply device with a constant power output level and output power control of such a device.

2. Description of the Related Art

FIG. 19 of the accompanying drawings is a schematic circuit diagram of a switching power supply device to be typically used for a film forming device. In FIG. 19, reference symbols Q1 through Q4 denote respectively switching elements, which form a full-bridge; and reference symbol T1 denotes a transformer, while D1 through D4 respectively denotes rectifier diodes for the output of the transformer; and L denotes an output choke coil. Additionally, reference symbols Co, R, Vin, n1, n2 and VQ respectively denote a smoothing capacitor, a load, an input voltage source, a primary winding, a secondary winding and output voltage.

Constant power control is required for controlling a film forming device. Therefore, the power supply device of the system operates for power output in a manner as illustrated in FIG. 21. In FIG. 21, Vo denotes the output voltage of the power supply device and Io denotes the output current of the device.

In FIG. 21, $V_1$ and $I_2$ respectively indicate the highest output voltage and the largest output current, while $V_2$ and $I_2$ respectively indicate the output voltage and the output current at the opposite ends of the power output performance curve of the device. The constant power output range is found between A and B in FIG. 21. If $V_1$=500V and $I_2$=40A in FIG. 21, the output capacity of the power supply device is 20 kW ($V_1 \times I_2$). However, the maximum output of the device may be 10 kw if $I_1$=20A and $V_2$=250V for $I_C \times V_1$ (=$I_2 \times V_2$) because of constant power control.

Therefore, the transformer is poorly exploited as it is used at the output level of 10 kW although it has a capacity of 20 kW. On the other hand, the switching elements Q1 through Q4 are arranged to form a full-bridge and used for pulse width control (PWM) with a constant cycle period Ts (FIG. 20). PWM itself is well known. FIGS. 20(a) through 20(d) show the waveforms of gate signals of Q1 through Q4; and FIG. 20(e) shows the waveform of the pulse output of the full-bridge (the primary input of the transformer) that has a pulse width of t. Because of constant power output, the output voltage is reduced to consequently show a small pulse width when the output current of the power supply device shows the maximum level. This means that a large smoothing filter is needed to rectify and smooth the voltage (see waveform FIG. 20(f)).

As pointed out above, the conventional control method is accompanied by disadvantages including that the transformer is poorly exploited and hence the use of a large filter is required and that the effective current of the switching/transforming section and that of the primary winding of the output transformer are increased to increase the loss of the output transformer and that of the switching elements because of the small pulse width in constant power output operations, which requires the use of large heat sink fins to obstruct efforts for down-sizing.

SUMMARY OF THE INVENTION

In view of the drawbacks of the prior art, it is therefore an object of the present invention to provide a power supply device that can fully exploit its transformer and minimize the factors that give rise to ripples in the output voltage so that the transformer and the smoothing filter may be downsized and the loss of power of the switching elements may be reduced in constant power output operations. Thus, a power supply device according to the invention can be provided with reduced dimensions.

The first aspect of the invention, a power supply device supplying an output voltage from smoothing circuits to a load, comprising; a first primary winding and a second primary winding, and a first secondary winding and a second secondary winding magnetically coupled respectively to said first and second primary windings; a first current supply circuit and a second current supply circuit for respectively supplying electric currents to said first and second primary windings and inducing alternating voltages in said first and second secondary windings by making said electric current flow to said first and second primary windings; a rectifying circuit for rectifying the respective alternating voltages induced in said first and second secondary windings and being connected to said first and second secondary windings respectively at their ends; and a smoothing circuit for smoothing the voltage output from said rectifying circuit, other ends of said first and second secondary windings being short circuited, said first and second current supply circuits being adapted to control phases of alternating currents supplied to said first and second primary windings respectively.

The second aspect of the invention is directed to the power supply device according to the first aspect, wherein an operation period of said power supply device includes a period where said first and second secondary windings are connected in parallel relative to said rectifying circuit as a function of polarities of the voltages induced in said first and second secondary windings respectively, and said period of said parallel connection is changed by controlling said phases by means of said first and second current supply circuits.

The third aspect of the invention is directed to the power supply device according to the second aspect, wherein an operation period of said power supply device includes a period where said first and second secondary windings are connected in series relative to said rectifying circuit for a period as a function of polarities of the voltages induced in said first and second secondary windings respectively, and said period of said series connection is changed by controlling said phases by means of said first and second current supply circuits.

The fourth aspect of the invention is directed to the power supply device according to the second aspect, further comprising a measuring circuit for measuring an output voltage and output current supplied to said load and controlling phases of said first and second current supply circuits based on a measurement result.

The fifth aspect of the invention is directed to the power supply device according to the third aspect, further comprising a measuring circuit for measuring the output voltage and output current supplied to said load and controlling phases of said first and second current supply circuits based on the measurement results.

The sixth aspect of the invention is directed to the power supply device according to the fourth aspect, wherein said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

The seventh aspect of the invention is directed to the power supply device according to the fifth aspect, wherein said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

The eighth aspect of the present invention is directed to the power supply device according to the fifth aspect, wherein said first and second current supply circuits prolong the period of connecting said first and second secondary windings in series by controlling said phases upon detection by said measuring circuit of any decrease in said output voltage, and shorten the period of connecting said first and second secondary windings in series by controlling said phases upon detection by said measuring circuit of any increase in said output voltage.

The ninth aspect of the invention is directed to the power supply device according to the second aspect, wherein said first and second current supply circuits supply respective electric currents to said first and second primary windings so as to make frequencies of the alternating voltages induced in said first and second secondary windings equal to each other.

The tenth aspect of the invention is directed to the power supply device according to the third aspect, wherein said first and second current supply circuits supply respective electric currents to said first and second primary windings so as to make frequencies of the alternating voltages induced in said first and second secondary windings equal to each other.

The eleventh aspect of the invention is directed to a power supply device supplying an output voltage from smoothing circuits to a load, comprising: a first primary winding and a second primary winding, and a first secondary winding and a second secondary winding magnetically coupled respectively to said first and second primary windings; a first current supply circuit and a second current supply circuit for respectively supplying a forwardly flowing electric current and a backwardly flowing electric current to said first and second primary windings and inducing voltages in said first and second secondary windings; a rectifying circuit for rectifying the respective voltages induced in said first and second secondary windings; and a smoothing circuit for smoothing the voltage output from said rectifying circuit; said rectifying circuit having a first series connected circuit, a second series connected circuit, and a third series connected circuit, each being formed by connecting two rectifying elements in series at a connection point, said first through third series connected circuits being short circuited respectively at anode sides and cathode sides and connected to said smoothing circuit; said first and second secondary windings being connected respectively at their ends thereof to connection middle points of said first and second series connected circuits; said first and second secondary windings being connected respectively to other ends thereof to a connection middle point of said third series connected circuits.

The twelfth aspect of the invention is directed to the power supply device according to the eleventh aspect, wherein each of said two rectifying elements of said first series connected circuit consists at least two rectifying elements connected in parallel, respectively.

The thirteenth aspect of the invention is directed to the power supply device according to eleventh aspect wherein an operation period of said power supply device includes periods where said first and second secondary windings are connected in parallel and in series relative to said rectifying circuits respectively as a function of polarities of the voltages induced in said first and second secondary windings respectively, and said periods of said series connection and that of said parallel connection are changed by controlling phases of alternating voltages induced in said first and second secondary windings by means of said first and second current supply circuits.

The fourteenth aspect of the invention is directed to the power supply device according to thirteenth aspect, further comprising a measuring circuit for measuring an output voltage and an output current supplied to said load, said first and second current supply circuits being adapted to control said phases based on a measurement result.

The fifteenth aspect of the invention is directed to the power supply device according to the thirteenth aspect, wherein said first and second current supply circuits prolong the period of said series connection of the said first and second secondary windings by controlling said phases upon detection by said measuring circuit of any reduction in said output voltage and shorten the period of said series connection of said first and second secondary windings upon detection by said measuring circuit of any increase in said output voltage.

The sixteenth aspect of the present invention is directed to the power supply device according to the thirteenth aspect, wherein said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

The seventeenth aspect of the present invention is directed to the power supply device according to the thirteenth aspect, wherein said first and second current supply circuits supply respective electric currents to said first and second primary windings so as to make the frequencies of the alternating voltages induced in said first and second secondary windings equal to each other.

The eighteenth aspect of the invention is directed to a power supply device supplying an output voltage from smoothing circuits to a load, comprising: a first primary winding and a second primary winding, and a first secondary winding and a second secondary winding magnetically coupled respectively to said first and second primary windings; a first current supply circuit and a second current supply circuit for respectively and intermittently supplying electric currents to said first and second primary windings and inducing voltages in said first and second secondary windings; a rectifying circuit for rectifying respective voltages induced in said first and second primary windings; and a smoothing circuit for smoothing the voltage output from said rectifying circuit, the smoothing circuit being connected to a first common connection point and a second common connection point included in said rectifying circuit, said rectifying circuit having a first rectifying element, a second rectifying element, and a third rectifying element, said first and second secondary windings being connected respectively at their ends thereof to a first common connection point by way of said first and second rectifying elements; said first and second secondary windings being connected respectively to other ends thereof to a second common connection point, said second common connection point being connected to said first common connection point by way of said third rectifying element.

The nineteenth aspect of the invention is directed to the power supply device according to the eighteenth aspect, wherein an operation period of said power supply device includes a period where said first and second secondary windings are connected in parallel relative to said rectifying circuit as a function of polarities of the voltages induced in said first and second secondary windings respectively, and said period of said parallel connection is changed by controlling said phases of the alternating voltages induced in said first and second secondary windings by means of said first and second current supply circuits.

The twentieth aspect of the invention is directed to the power supply device according to nineteenth aspect, further comprising a measuring circuit for measuring an output voltage and an output current supplied to said load, said first and second current supply circuits being adapted to control said phases based on the measurement result.

The twenty first aspect of the invention is directed to the power supply device according to the twentieth aspect, wherein said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

The twenty second aspect of the invention is directed to the power supply device according to the thirteenth aspect, wherein said first and second current supply circuits supply respective electric currents to said first and second primary windings so as to make the frequencies of the alternating voltages induced in said first and second secondary windings equal to each other.

BRIEF DESCRIPTION OF THE DRAWINGS

FIG. 19 is a circuit diagram of a known power supply device.

FIG. 20 is a graph illustrating waveforms that appear when the known device of FIG. 19 is in operation.

DETAILED DESCRIPTION OF THE PREFERRED EMBODIMENTS

Now, the present invention will be described by referring to the accompanying drawings that illustrate preferred embodiments of the present invention.

Figure 22:
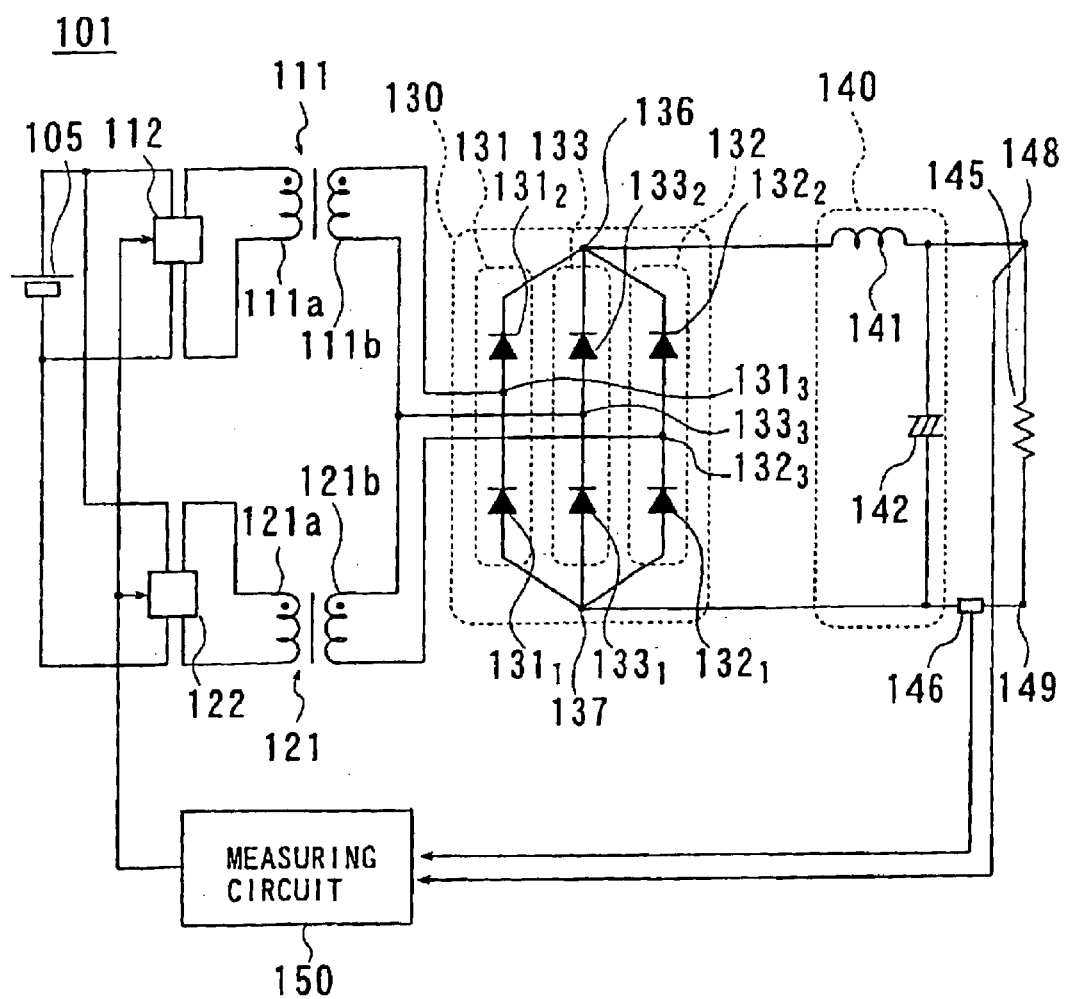
FIG. 22 is a circuit diagram illustrating a first preferred embodiment of the invention.

FIG. 22 is a circuit diagram of a first embodiment. Referring to FIG. 22, a power supply circuit 101 of the first embodiment comprises first and second transformers 111, 121.

The first and second transformers 111, 121 respectively have first and second primary windings 111a, 121a and first and second secondary windings 111b, 121b that are magnetically coupled to the first and second primary windings 111a, 121a respectively.

The first and second primary windings 111a, 121a are respectively connected to first and second current supply circuits 112, 122, which are connected to a DC voltage source 105. An electric current can be made to flow forwardly or backwardly through the first and second primary windings 111a, 121a by changing the internal connection of the first and second current supply circuits 112, 122. In other words, the first and second current supply circuits 112, 122 are adapted to respectively feed the first and second primary windings 111a, 121a with an alternating current.

The first and second secondary windings are connected to a rectifying circuit 130, which is connected to a smoothing circuit 140. As an alternating current is supplied to the first and second primary windings 111a, 121a, an alternating voltage is induced in both the first and second secondary windings 111b, 121b. The induced alternating voltage is rectified and smoothed by the rectifying circuit 130 and the smoothing circuit 140 before it is supplied to a load 145.

The rectifying circuit 130 and the smoothing circuit 140 have respective internal configurations as described below The rectifying circuit 130 has first through third series connection circuits 131, 132, 133 formed by connecting respective pairs of rectifying elements $131_1$, $131_2$, $132_1$, $132_2$, $133_1$, $131_2$ in series.

The first through third series connection circuits 131 through 133, respectively, are connected to a first common connection point 136 at the cathode side and to a second common connection point 137 at the anode side.

The first and second secondary windings 111b, 121b are respectively connected at their ends thereof to first and second connection middle points 131₃, 132₃ of the first and second series connection circuits 131, 132 and at the other ends commonly to the connection middle point 133₃ of the third series connection circuit 133.

The polarities of the parts of the first and second secondary windings 111b, 121b connected to the third connection middle point 133₃ are inverted relative to each other. Therefore, when electric currents are made to flow respectively through the first and second primary windings 111a, 121a simultaneously in a same direction, the voltage at the third connection middle point 133₃ is equal to the middle of the voltage produced at the first connection middle point 1313 and the voltage produced at the second connection middle point 132₃. In other words, when electric currents are made to flow respectively through the first and second primary windings 111a, 121a simultaneously in a same direction, a voltage equal to the sum of the voltages generated in the first and second secondary windings 111b, 121b is applied between the first common connection point 136 and the second common connection point 137. Thus, the first and second secondary windings 111b, 121b are connected in series.

Conversely, when electric currents are made to flow respectively through the first and second primary windings 111a, 121a simultaneously in opposite directions, the voltage at the first connection middle point 131₃ and the voltage at the second connection middle point 132₃ are made equal to each other by the voltages induced in the first and second secondary windings 111b, 121b when the electric potential of the third connection middle point 133₃ is selected as reference potential. Therefore, an electric current equal to the sum of electric currents flowing respectively through the first and second secondary windings 111b, 121b flows through the first and second common connection points 136, 137. Thus, the first and second secondary windings 111b, 121b are connected in parallel.

The smoothing circuit 140 has a choke coil 141 and a smoothing capacitor 142. The choke coil 141 is connected at an end thereof to the first common connection point 136 and at the other end to a high voltage side output terminal 148.

The second common connection point 137 is connected to a low voltage side output terminal 149. The high voltage side output terminal 148 and the low voltage side output terminal 149 are connected to each other by way of an electrolytic capacitor 142.

The voltages induced in the first and second secondary windings 111b, 112b are rectified by the rectifying circuit 130 and output to the smoothing circuit 140 from the first and second common connection points 136, 137. Then, the rectified voltages are smoothed by the smoothing circuit 140 and appear between the high voltage side output terminal 148 and the low voltage side output terminal 149 as DC voltage.

The load 145 is connected between the high voltage side output terminal 148 and the low voltage side output terminal 149; and hence, the DC voltage is applied to the load 145.

The power supply circuit according to the invention further comprises a measuring circuit 150.

The measuring circuit 150 is designed to measure the output voltage and the output current supplied from the smoothing circuit 140 to the load 145.

The measuring circuit 150 measures the voltage of the high voltage side output terminal 148 relative to the potential of the low voltage side output terminal 149. A current detector 146 detects the electric current flowing to the low voltage side output terminal 149 through the load 145.

When the measuring circuit 150 detects that the output voltage is lowered, it controls the operation of the first and second current supply circuits 112, 122 so as to maintain the output voltage output from the high voltage side output terminal 148 to a constant level.

When, on the other hand, the output current is raised above a predetermined upper limit current level, the measuring circuit 150 no longer maintains the output voltage to a constant level but lowers it to feed the load with constant power by controlling the phases of operation of the first and second current supply circuits 112, 122 so as to prolong the period during which the first and second secondary windings 111b, 121b are connected in parallel and increase the output current.

As described above, since alternating currents are flowing respectively through the first and second primary windings 111a, 121a, the timings at which respective voltages are induced in the first and second secondary windings 111b, 121b and the polarities of the respective induced voltages can be changed by changing the relative timings of the alternating currents flowing through the first and second primary windings respectively. As a result, it is possible to control the voltage and the power fed to the load 145 by selectively making the first and second secondary windings 111b, 121 operate in a state where they are connected in parallel or in a state where they are connected in series.

When the first and second current supply circuits 112, 122 operate with a same frequency and alternating currents having a same frequency are made to flow through the first and second primary windings 111a, 121a respectively, the timings at which respective voltages are induced internal the first and second secondary windings 111b, 121b and the polarities of the respective induced voltages can be changed by controlling the phase difference of the electric currents flowing through the first and second primary windings 111a, 121a.

Now, a second preferred embodiment of the present invention will be described.

Figure 23:
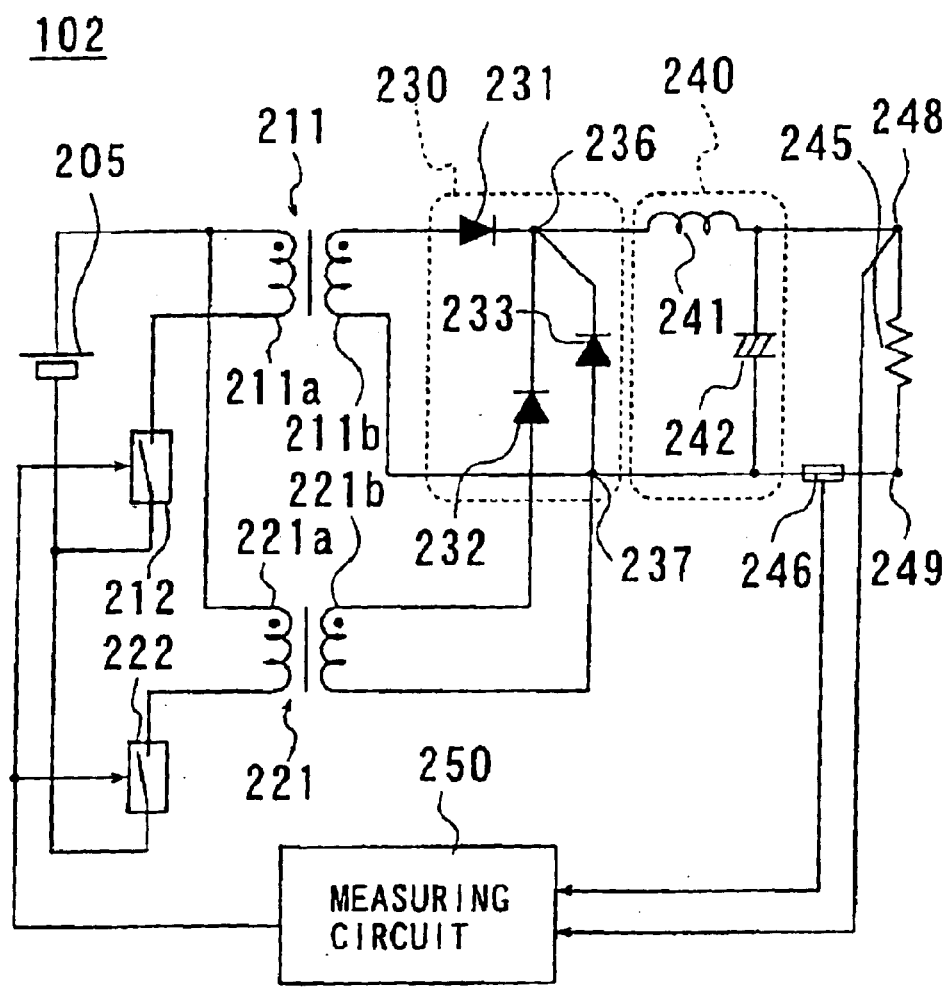
FIG. 23 is a circuit diagram illustrating a second preferred embodiment of the invention.

FIG. 23 is a circuit diagram of the second embodiment. Referring to FIG. 23, as in the case of the power supply circuit 101 of the first embodiment, the power supply circuit 102 comprises first and second current supply circuits 212, 222, first and second transformers 211, 221, a rectifying circuit 230 and a smoothing circuit 240. The first and second transformers 211, 221 respectively have first and second primary windings 211a, 221a and first and second secondary windings 211b, 221b that are magnetically coupled to the first and second primary windings 211a, 221a.

In FIG. 23, reference symbol 205 denotes a DC voltage source. The first and second primary windings 211a, 221a are connected at their ends thereof to the high voltage side terminal of the DC voltage source 205 and at the other ends thereof to the low voltage side terminal of the DC voltage source 205 by way of the first and second current supply circuits 212, 222 respectively.

The first and second current supply circuits 212, 222 comprise respective transistors. As the transistors are turned on/off at desired timings, an electric current intermittently flows through the first and second primary windings 211a, 221a so that AC voltages are induced in the first and second secondary windings 211b, 221b respectively.

The AC voltages induced in the first and second secondary windings 211b, 221b are rectified by a rectifying circuit 230 and smoothed by a smoothing circuit 240; and the DC voltages are supplied to a load 245 from a high voltage side output terminal 248 and a low voltage side output terminal 249 respectively.

The internal structure of the rectifying circuit 230 has first through third rectifying elements 231 through 233.

The first and second secondary windings 211b, 221b are connected at their ends thereof to a first common connection point 236 by way of first and second rectifying elements 231, 232 respectively and at the other ends thereof to a second common connection point 237.

The second common connection point 237 and the first common connection point 236 are connected to each other by way of the third rectifying element 233. Thus, the first through third rectifying elements 231 through 233 are connected to the first common connection point 236. As for the polarities thereof, the first through third rectifying elements 231 through 233 are connected to the first common connection point 236 at the cathode sides thereof.

Therefore, the AC voltages induced in the first and second secondary windings 211b, 221b are half-wave rectified and appear between the first and second common connection points 236, 237, As pointed out earlier, the AC voltages induced in the first and second secondary windings 111b, 121b of the power supply device 101 of the first embodiment are full-wave rectified by the rectifying circuit 130. This provides a major difference between the power supply circuit 101 of the first embodiment and the power supply circuit 102 of the second embodiment.

The rectifying circuit 240 has in the inside thereof a choke coil 241 and a smoothing capacitor 242. The choke coil 241 is connected at an end thereof to the first common connection point 236 and at the other end to the high voltage side output terminal 248.

The smoothing capacitor 242 is connected at the high voltage side terminal thereof to a high voltage side output terminal 248 and at the low voltage side terminal thereof to a low voltage side output terminal 249. The second common connection point 237 is connected to the low voltage side output terminal 249. The half-rectified voltages respectively output from the first and second common connection points 236, 237 of the rectifying circuit 230 to the smoothing circuit 240 are smoothed in the smoothing circuit 240 and DC voltages are applied to the load 245 from the high voltage side output terminal 248 and the low voltage side output terminal 249 respectively.

With this power supply device 102, as voltages are induced in the first and second secondary windings 211b, 221b with such polarities and at such timings that positive voltages are simultaneously applied to the respective anode terminals of the first and second rectifying elements 231, 232, the first and second secondary windings 211b, 221b are connected in parallel and electric currents are supplied from both the first and second secondary windings 211b, 221b to the smoothing circuit 240.

On the other hand, when voltages are induced in the first and second secondary windings 211b, 221b with such polarities that negative voltages are applied to the respective anode terminals of the first and second rectifying elements 231, 232, the first and second rectifying elements 231, 232 are cut off from each other. When the first and second rectifying elements 231, 232 are cut off from each other, the third rectifying element 233 is made conductive by the electromotive force generated in the choke coil 240; and an electric current is fed to the load 245 by the energy accumulated in the choke coil 240 and the smoothing capacitor 246.

The power supply device 102 further comprises a measuring circuit 250.

The measuring circuit 250 is designed to measure the output voltage and the output current appearing at the high voltage side output terminal 248. More specifically, a current detector 246 is provided at the low voltage side output terminal 249; and the output current is measured by detecting the electricity flowing to the low voltage side output terminal 249.

As the measuring circuit 250 detects fluctuations in the voltage (output voltage) of the output terminal 248, it controls the operation of the first and second current supply circuits 212, 222 and changes the period during which electric currents are supplied respectively to the first and second primary windings 211a, 221a to maintain the output voltage to a constant level.

If, on the other hand, the output current is raised to exceed a predetermined upper limit, the period during which the first and second secondary windings 211b, 221b are connected in parallel is prolonged to lower the output voltage and reduce the output current.

EXAMPLE

Figure 1:
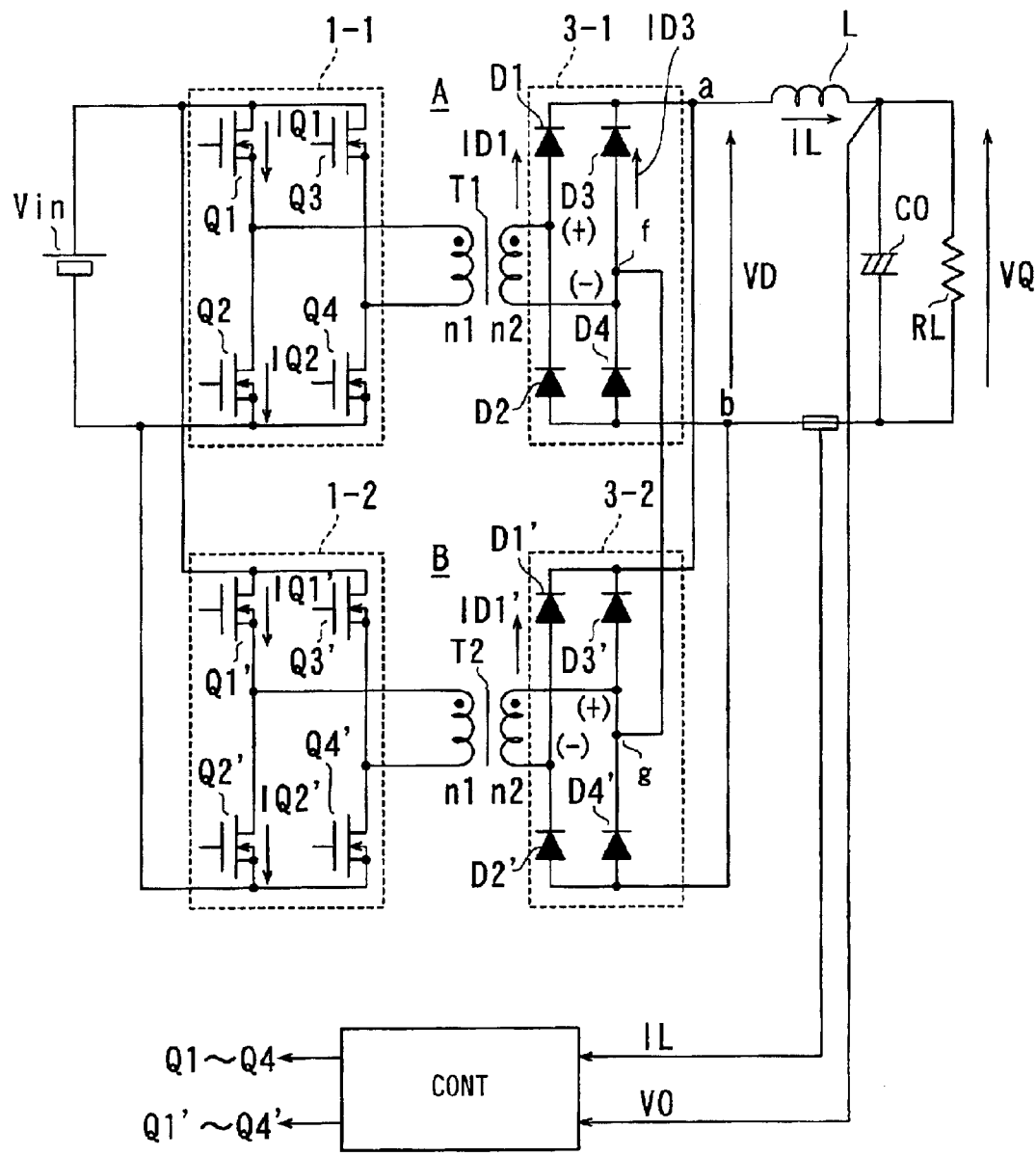
FIG. 1 is a circuit diagram of an example of the invention.

FIG. 1 is a circuit diagram of an example of the invention. Referring to FIG. 1, reference symbol 1—1 denotes a full-bridge type switching changer comprising switching elements Q1 through Q4. T1 denotes a transformer in which the primary winding n1 and the secondary winding n2 are made to show a turn ratio of 1:n. Reference symbol 3-1 denotes a rectifying circuit comprising rectifying diodes D1 through D4. L denotes an output choke coil and Co denotes a smoothing capacitor, while RL denotes a load. A DC power supply device A is formed by these components.

Another DC power supply device B similar to the DC power supply device A is formed also by a switching changer 1-2, an output transformer T2 and a rectifying circuit 3-2. The terminals a, b of the power supply devices A, B are connected in parallel. The (−) terminal (f), which is the AC input terminal of the rectifying circuit 3-1, and the (+) terminal (g) of the rectifying circuit 3-2 are commonly connected. In FIG. 1, reference symbol CONT denotes a control circuit that controls the voltage $V_o$ and the current signal IL of the load RL by sending a pulse width control (PWM) signal to the switches Q1, Q1' through Q4, Q4' of the switching changers 1—1, 1-2.

The circuit operates basically in the following manner. The changers 1—1 and 1-2 operate synchronously with a same frequency and the switches Q1, Q4 and Q2, Q3 of the changer 1—1 and the switches Q1', Q4' and Q2', Q3' of the changer 1-2 operate as pairs and are turned on and off at same timings. The switches Q1, Q4 and Q2, 03 of the changer 1—1 and the switches Q1', Q4' and Q2', Q3' of the changer 1-2 have respective dead times of predetermined widths that are specific to them and alternately operate with a fixed time ratio. Additionally, the striking phases of the switches Q1 through Q4 of the changer 1—1 are fixed; whereas, the striking phases of the switches Q1' through Q4' of the changer 1-2 are variable. Thus, their phase differences are controlled to output a constant voltage and a constant power.

Figure 2:
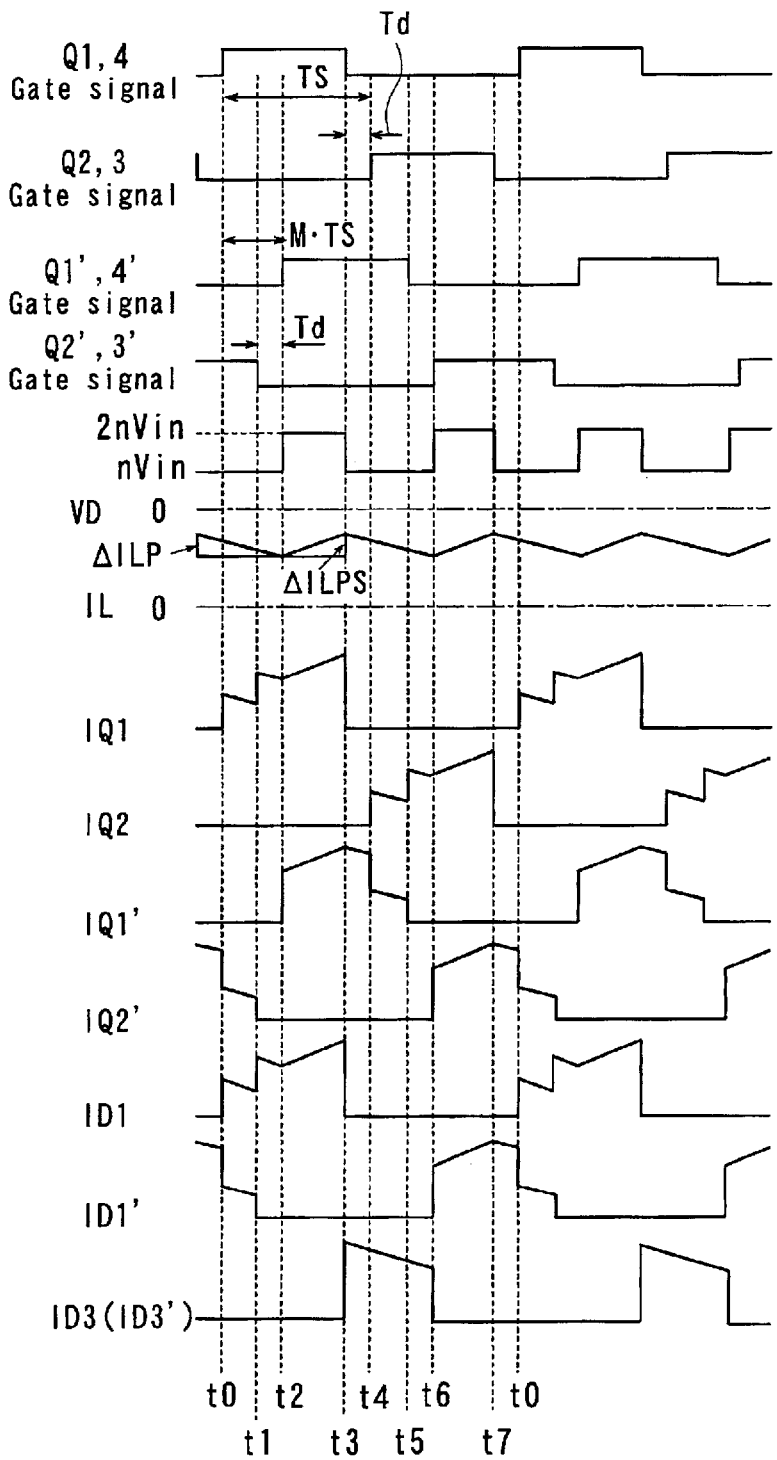
FIG. 2 is a graph illustrating waveforms that appear when the example of FIG. 1 is in operation.

Now, the operation of this example of circuit according to the invention will be described below. FIG. 2 is a graph illustrating the waveforms that appear when the example of FIG. 1 is in operation and FIGS. 3 through 10 are schematic equivalent circuit diagrams to be used for illustrating the operation of the example of FIG. 1.

[Operation Mode 1 (time t0 to t1 in FIG. 2)]

Figure 3:
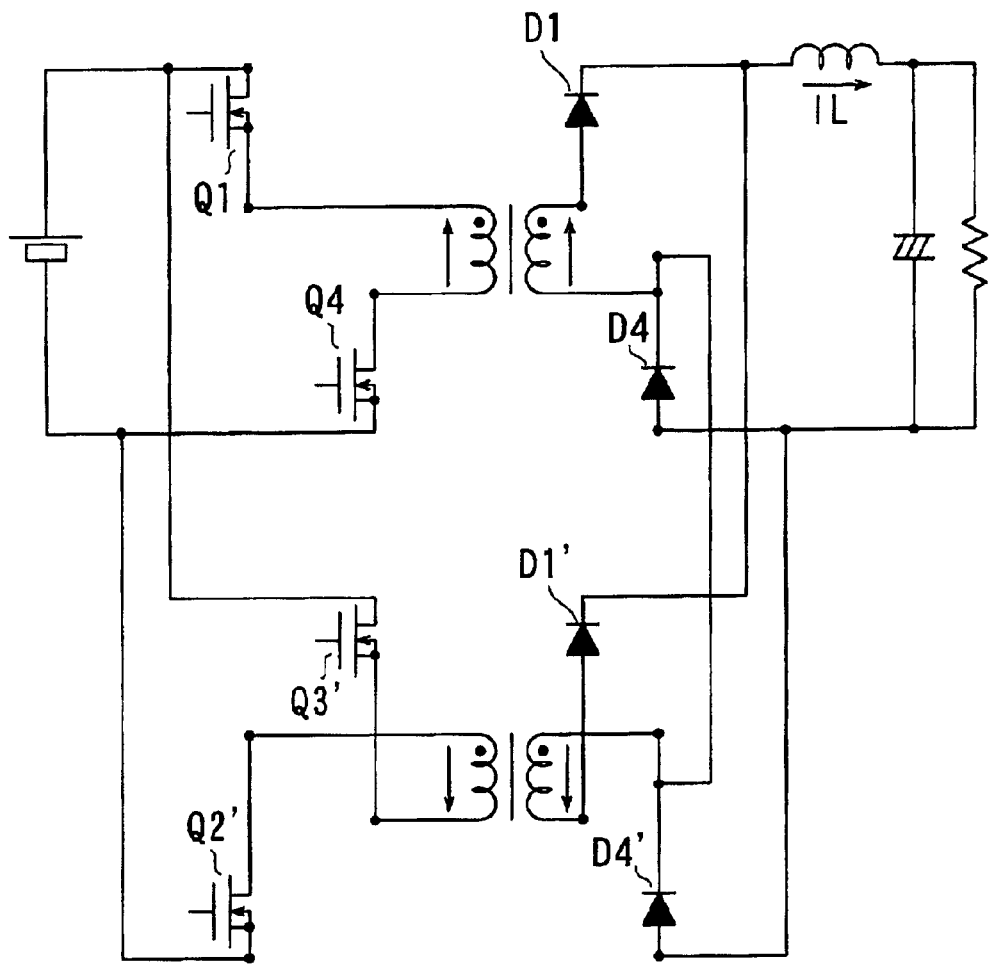
FIG. 3 is an equivalent circuit diagram to be used for illustrating the operation of the example of FIG. 1.

FIG. 3 is an equivalent circuit diagram in operation mode 1. In this operation mode, the switches Q1, Q4 of the switching changer 1—1 and the switches Q2', Q3' of the switching changer 1-2 are on as gate signals shown in (a) and (d) of FIG. 2 are applied to the respective pairs so that nVin appears in each of the secondary windings n2 of the transformers T1, T2 in the direction indicated by an arrow in FIG. 3 to make D1, D4 and D1', D4' conductive. Therefore, the output voltage VD appears as nVin because the rectifying circuits 3-1 and 3-2 shown in FIG. 1 are connected in parallel. Then, a voltage of nVin−$V_o$ is applied to the output choke L and the output choke current IL flows in the direction of reducing itself because the relation between $V_o$ and nVin is $V_o$>nVin. (parallel operation of switching changers 1—1, 1-2)

[Operation Mode 2 (time t1 to t2)]

Figure 4:
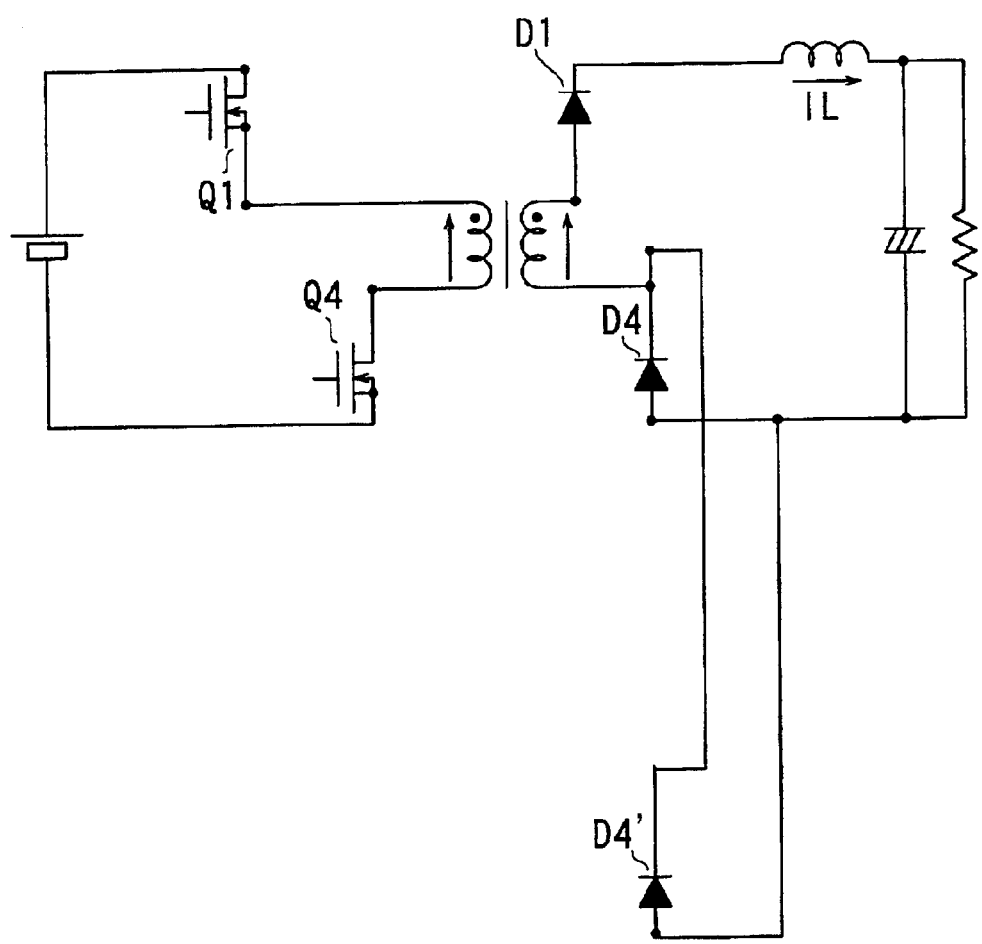
FIG. 4 is another equivalent circuit diagram to be used for illustrating the operation of the example of FIG. 1.

FIG. 4 is an equivalent circuit diagram in operation mode 2. In this operation mode, only the switches Q1, Q4 of the changer 1—1 are on as no gate signal is applied to any of the switches Q1' through Q4' of the changer 1-2 (dead time period) so that the output energy is supplied only from the changer 1—1. Therefore, the diodes D1, D4 and D4' (and since the connection point of the anode of the diode D3 and the cathode of the diode D4 of the rectifying circuit 3-1 and the connection point of the anode of the diode D3' and the cathode of the diode D4' of the rectifying circuit 3-2 are connected, the parallel connection with the diode D4) are made conductive and nVin appears there. Then, a voltage of nVin−$V_o$ is applied to the output choke L, and the output choke current IL flows in the direction of reducing itself as in the case of mode 1 because the relation between $V_o$ and nVin is $V_o$>nVin (isolated operation of switching changer 1—1).

[Operation Mode 3 (time t2 to t3)]

Figure 5:
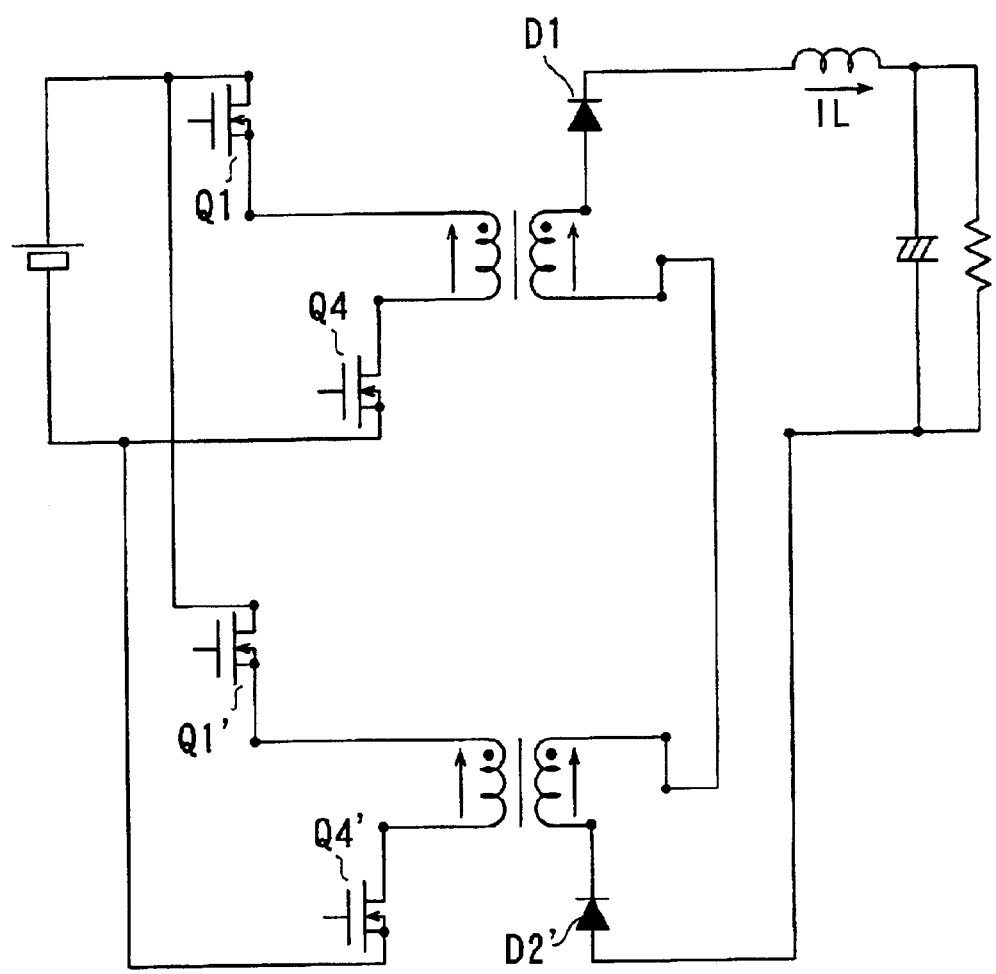
FIG. 5 is still another equivalent circuit diagram to be used for illustrating the operation of the example of FIG. 1.

FIG. 5 is an equivalent circuit diagram in operation mode 3. In this operation mode, the switches Q1, Q4 of the switching changer 1—1 and the switches Q1', Q4' of the switching changer 1-2 are on; and hence, nVin appear in the secondary winding n2 of each of the transformers T1, T2 in the direction indicated by an arrow in FIG. 5. Since the connection point of the anode of the diode D3 and the cathode of the diode D4 of the rectifying circuit 3-1 and the connection point of the anode of the diode D3' and the cathode of the diode D4' of the rectifying circuit 3-2 are connected in this system, the diodes D4 and D3' are inversely biased and the diodes D1, D2' are made conductive. Therefore, the secondary side outputs of the transformers T1, T2 are connected in series and a voltage of 2nVin is generated as output voltage VD of the rectifying circuits. Then, a voltage of 2nVin−$V_o$ is applied to the output choke L and the output choke current IL flows in the direction of increasing itself because the relation between 2nVin and $V_o$ is 2nVin>$V_o$ (series operation of switching changers 1—1, 1-2).

[Operation Mode 4 (time t3 to t4)]

Figure 6:
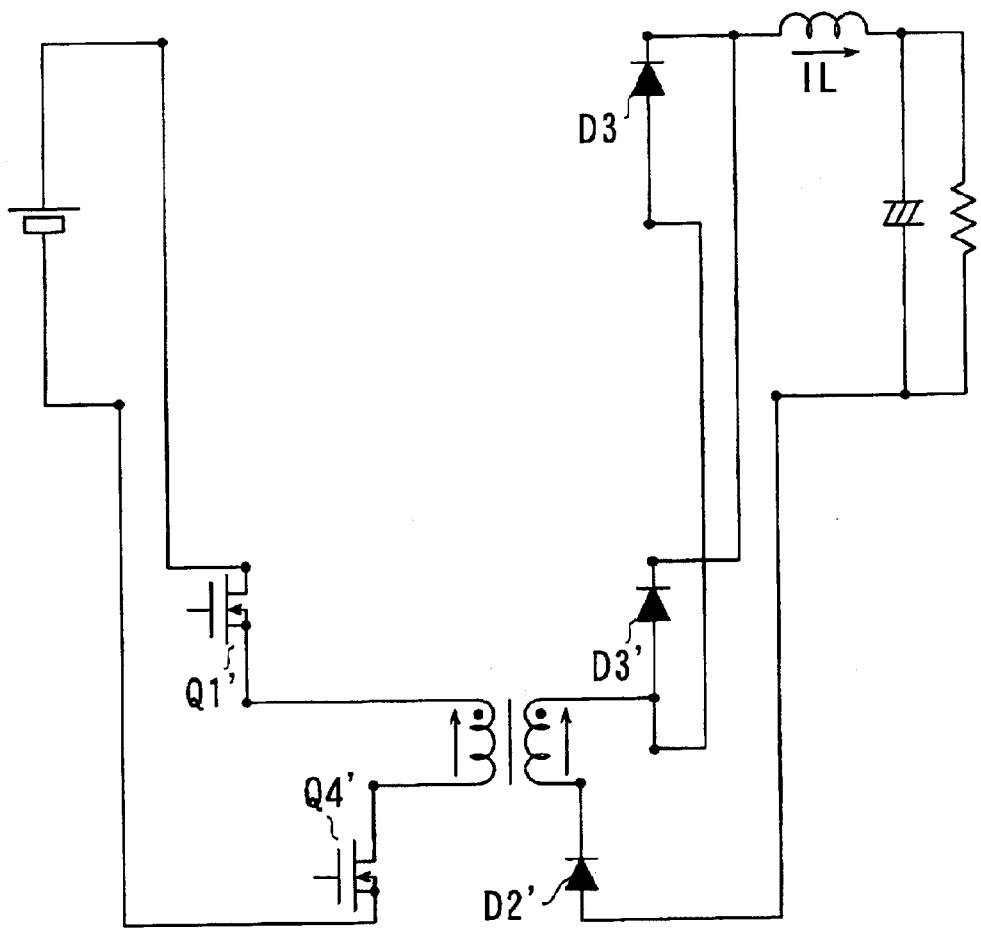
FIG. 6 is still another equivalent circuit diagram to be used for illustrating the operation of the example of FIG. 1.
Figure 7:
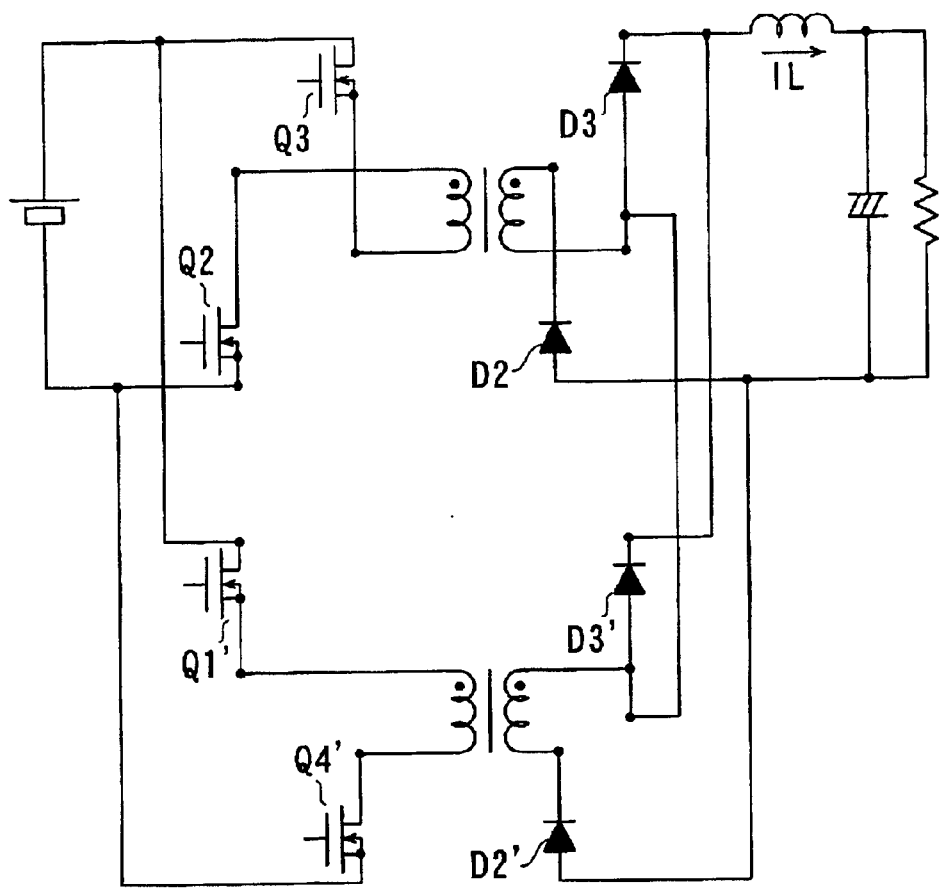
FIG. 7 is still another equivalent circuit diagram to be used for illustrating the operation of the example of FIG. 1.
Figure 8:
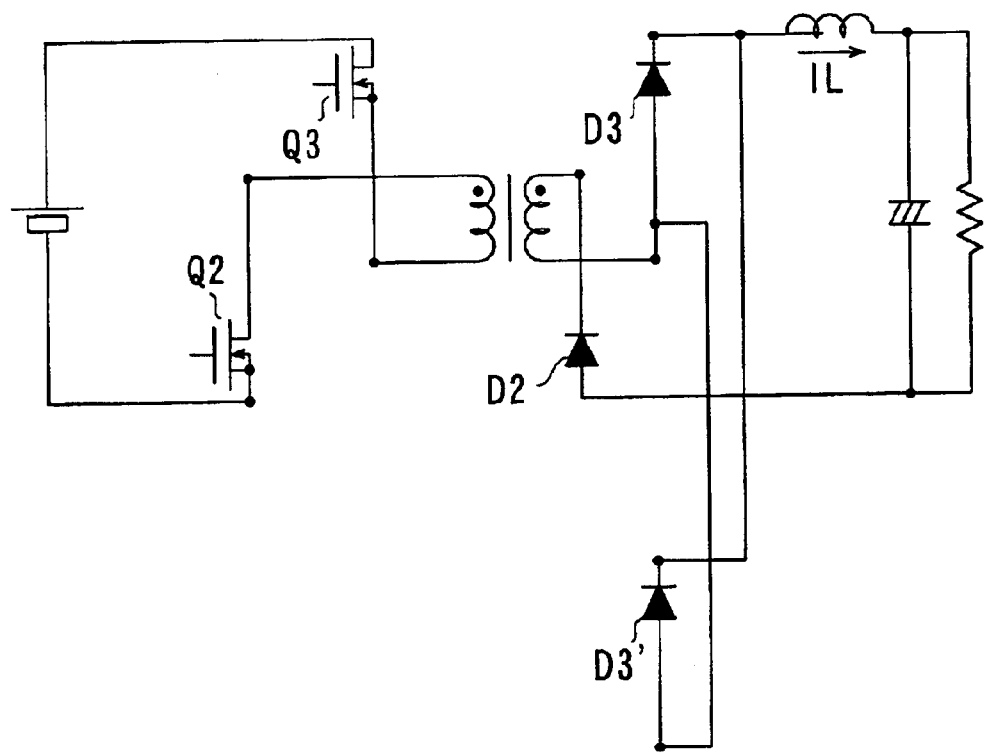
FIG. 8 is still another equivalent circuit diagram to be used for illustrating the operation of the example of FIG. 1.
Figure 9:
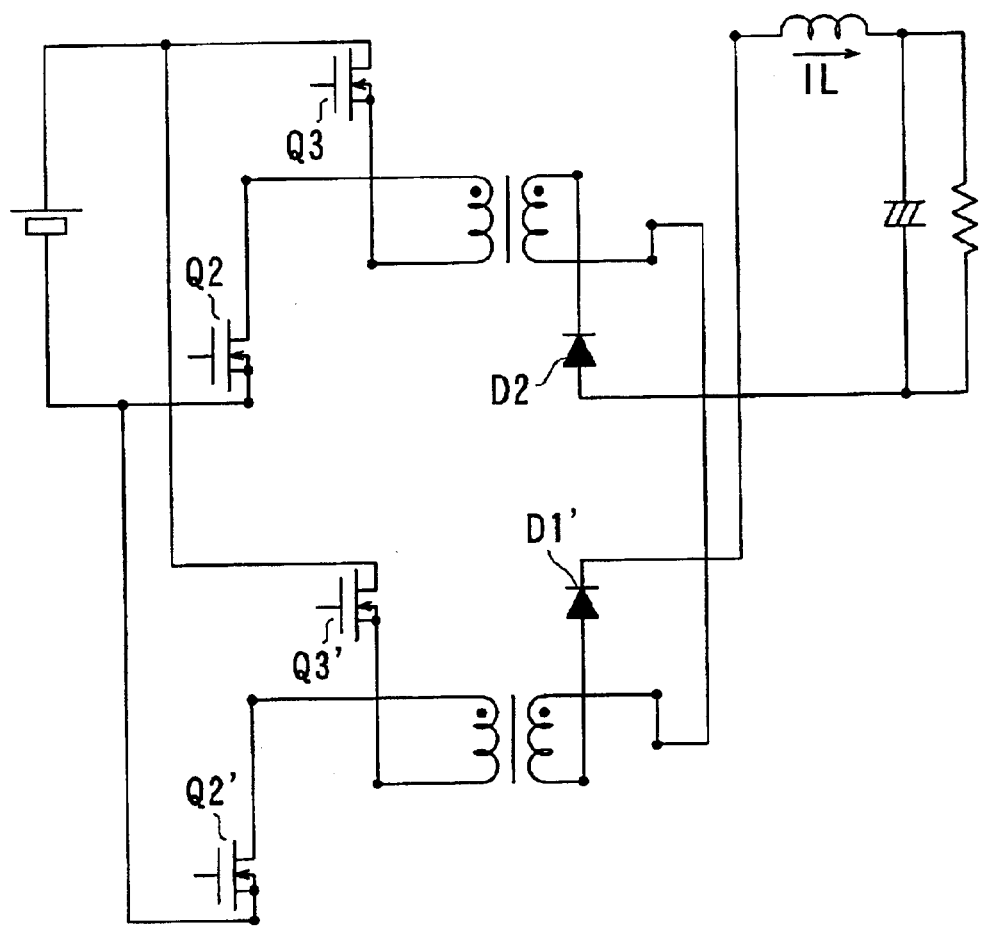
FIG. 9 is still another equivalent circuit diagram to be used for illustrating the operation of the example of FIG. 1.
Figure 10:
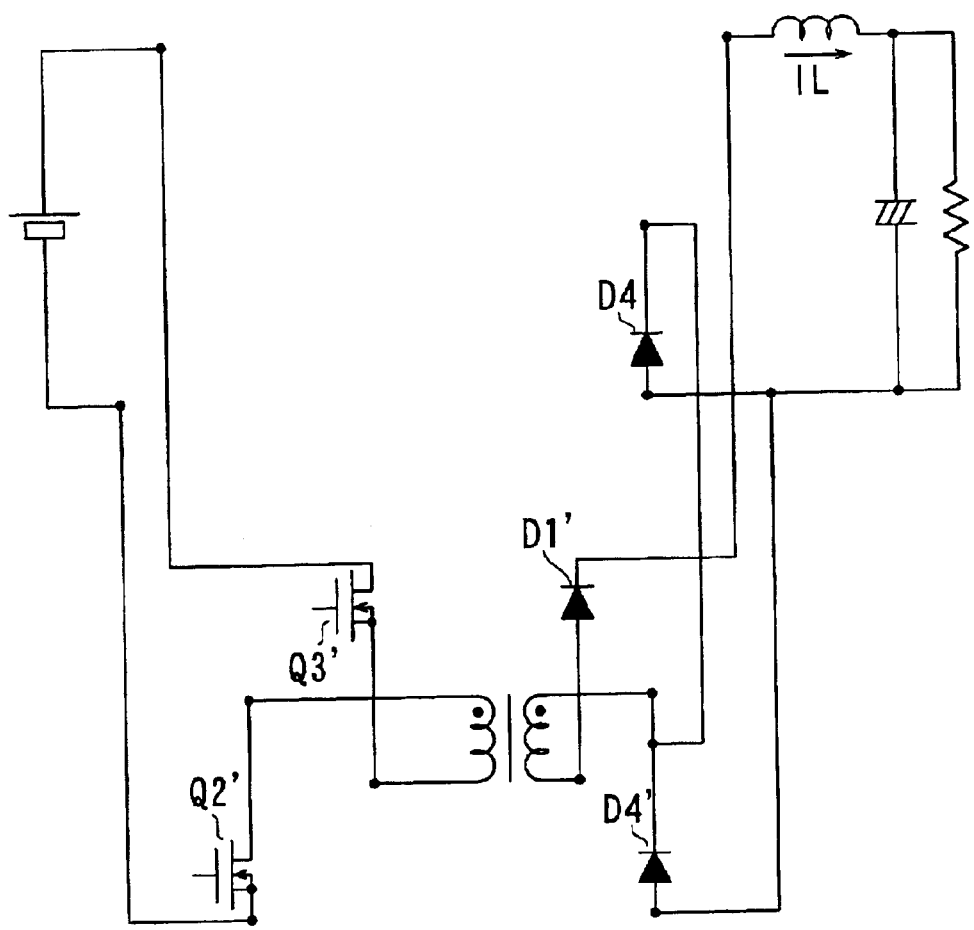
FIG. 10 is still another equivalent circuit diagram to be used for illustrating the operation of the example of FIG. 1.

FIG. 6 is an equivalent circuit diagram in operation mode 4. In this operation mode, only the switches Q1', Q4' of the changer 1-2 are on as no gate signal is applied to any of the switches Q1 through Q4 of the changer 1—1 (dead time period) so that the output energy is supplied only from the changer 1-2. Therefore, the diodes D2', D3' and D3 are made conductive and nVin appears there. Then, the output choke current IL flows in the direction of reducing itself because the relation between nVin and $V_o$ is nVin<$V_o$ (isolated operation of switching changer 1-2).

FIGS. 7, 8, 9 and 10 show equivalent circuit diagrams in operation of mode 5 (t4 to t5), mode 6 (t5 to t6)$_1$, mode 7 (t6 to t7) and mode 8 (t7 to t8) respectively. The operations of the above modes are repeated in these modes; and hence, will not be described hereinafter. In these modes (5 through 8), the gate signals shown in FIG. 2 are applied to the respective switch pairs of Q2, Q3 and Q1' through Q4' of the changers 1—1, 1-2. Thus, a parallel operation and an isolated operation of the changer 1—1 take place in modes 5 and 6 respectively. On the other hand, a series operation and an isolated operation of the changer 1-2 take place in modes 7 and 8 respectively.

As described above in detail, according to the invention, two direct current sources are connected in parallel or in series for operation or either of them is operated alone in order to constantly produce a desired DC output voltage $V_o$ and a desired output current IL. Thus, a DC power supply device according to the invention is highly adapted to supply power at a constant power level and also a voltage at a constant voltage level. In FIG. 1, the control circuit CONT controls the detected signals ($V_o$) and (IL) of the power supply device and a gate signal whose phase is fixed is applied to the switches Q1 through Q4 of the changer 1—1 with a switching cycle period of Ts, while a (M·TS) gate signal whose phase is delayed by a constant value relative to the phase of the above gate signal is applied to the switches Q1' through Q4' of the changer 1-2 also with a switching cycle period of Ts. The DC power supply device operates to supply power at a constant power level and also a voltage at a constant voltage level by utilizing the phase difference.

The voltage change ratio of the input voltage Vin to the output voltage $V_o$ of the device of FIG. 1 is determined in the following way. If the switching cycle period is Ts, the turn ratio of the primary winding to the secondary winding of each of the transformers T1, T2 is 1:n and the phase difference between the switch Q1 and the switch Q1' is φ (φ=M·Ts in terms of time region, where M is the delay constant), the variation (ΔILP) of the choke current IL in parallel operation (including the dead time) is expressed by formula A below when the choke current IL is decreasing.

$$\Delta I_{LP} = \frac{Von - n \times Vin}{L} \times M \times Ts \qquad \text{Formula A}$$

The variation (ΔILP) of the choke current IL in series operation is expressed by formula B below when the choke current IL is increasing.

$$\Delta I_{LS} = \frac{2n \times Vin - Vo}{L} \times (1 - M) \times Ts \qquad \text{Formula B}$$

In a steady state, equation (C) below holds true.

$$\Delta I_{LP} = \Delta I_{LS} \qquad \text{Formula C}$$

Therefore, equation (D) below also holds true.

$$\frac{Vo - n \times Vin}{L} \times M \times Ts = \frac{2n \times Vin - Vo}{L} \times (1 - M) \times Ts \qquad \text{Formula D}$$

The equation (D) can be reduced to equation (E) below.

$$\frac{Vo}{Vin} = n \times (2 - M) \qquad \text{Formula E}$$

Since $0 \leq M \leq 1$, $$n \leq \frac{Vo}{V\text{in}} \leq 2n. \qquad \text{Formula F}$$

Figure 21:
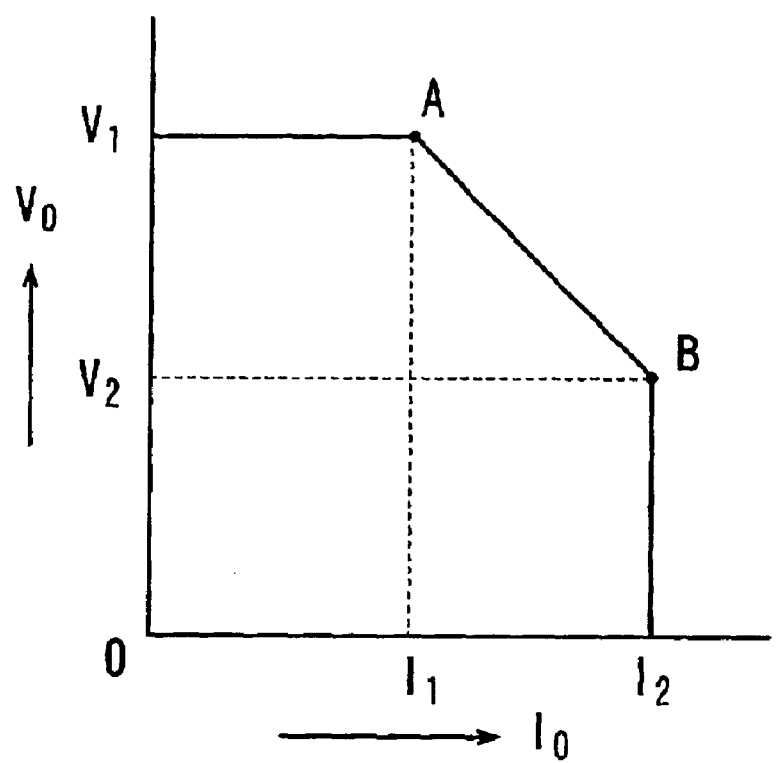
FIG. 21 is a graph illustrating output of a constant power supply device.

Therefore, the relationship between the input voltage Vin and the output voltage $V_o$ can be controlled within the above range. Thus, a power supply device according to the invention that is required to give a performance of FIG. 21 can operate for constant power and constant voltage by using the above described control method.

FIG. 2f shows the choke current waveform and FIG. 2g and FIG. 2h show the current waveforms of the switches Q1, Q2 respectively, while FIG., 2i and FIG. 2j show the current waveforms of the switches Q1', Q2' respectively. Similarly, FIG. 2k and FIG. 2 show the current waveforms for the rectifying diodes D1, D1' and FIG. 2m shows the current waveform of the rectifying diode D3 (or D3'). As it is clear from the circuit diagram of FIG. 1, D3' and D4' may be omitted because D3, D4 and D3', D4' are connected in parallel.

Figure 11:
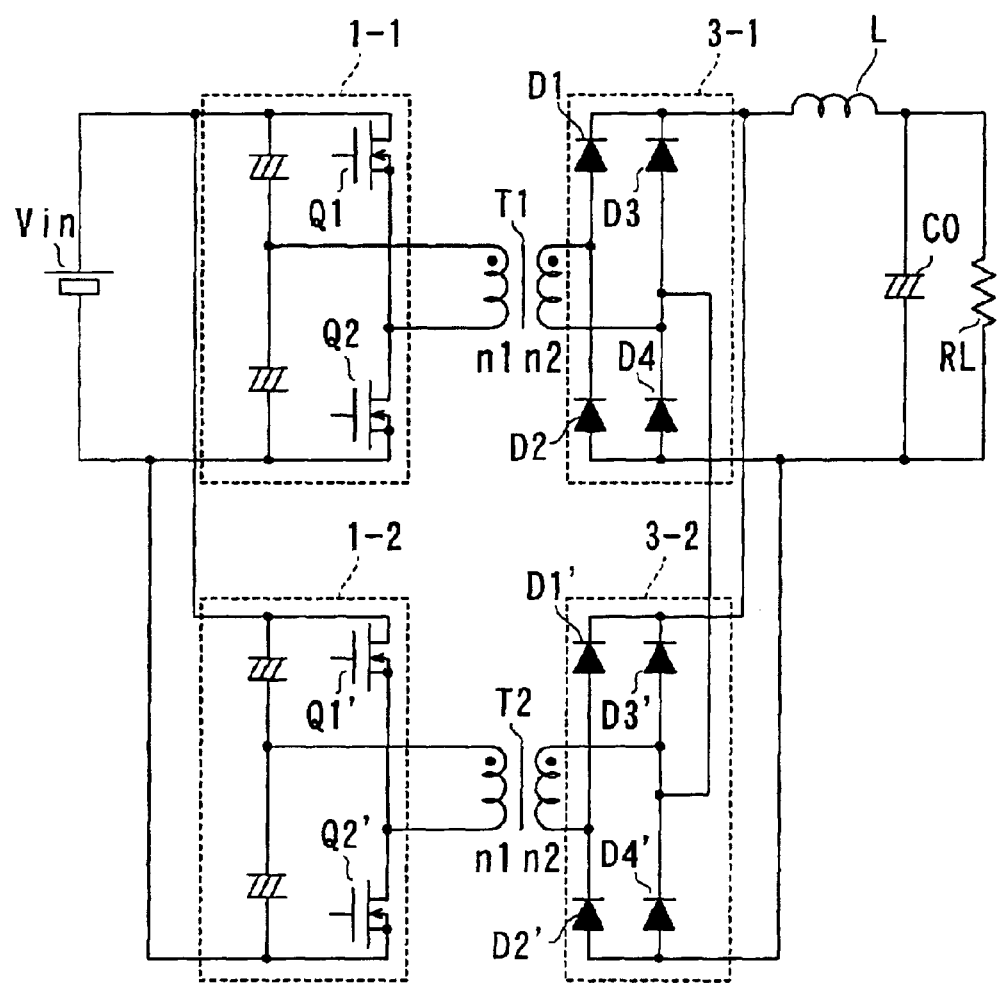
FIG. 11 is a circuit diagram of another example of the invention (half-bridge).
Figure 12:
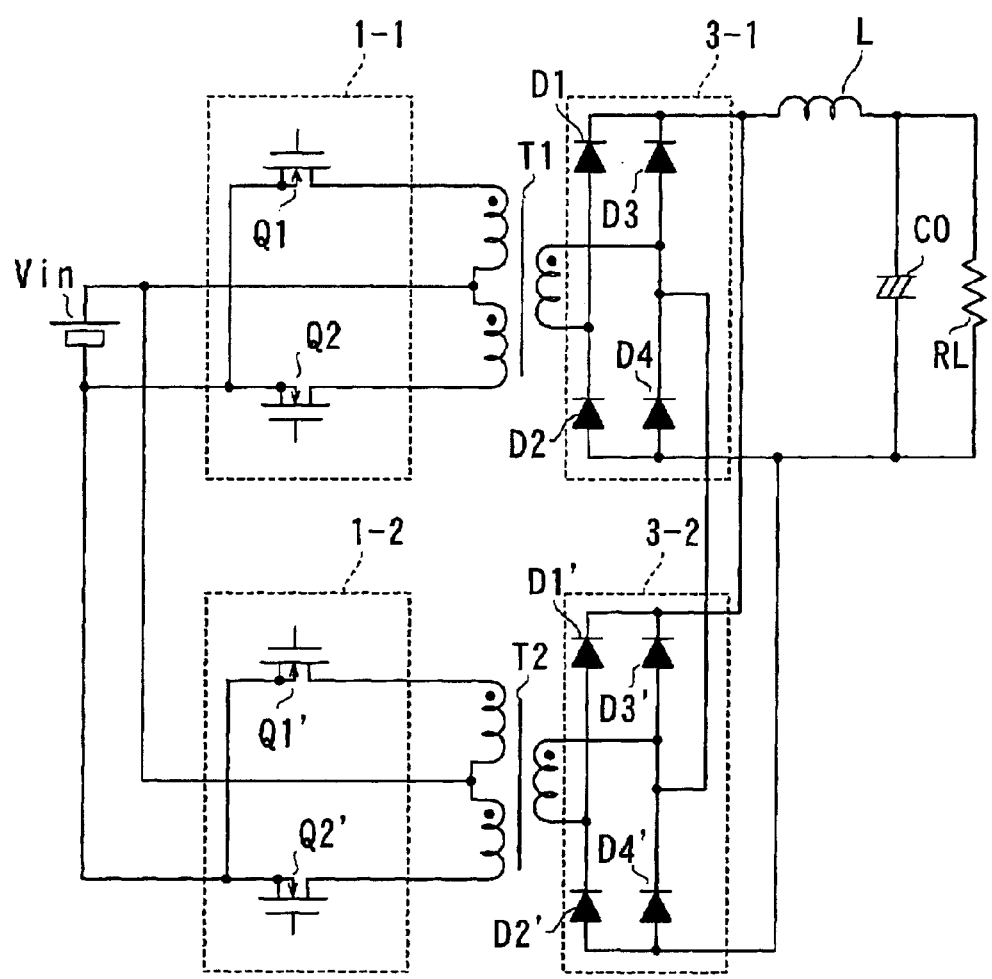
FIG. 12 is a circuit diagram of still another example of the invention (push-pull).

While the switching changer is of the full-bridge type and has four switching elements in the above description, it may alternatively be of the half-bridge or push-pull type to provide the same effect. FIGS. 11 and 12 respectively illustrate circuit diagrams of a half-bridge type device and a push-pull type device.

Figure 13:
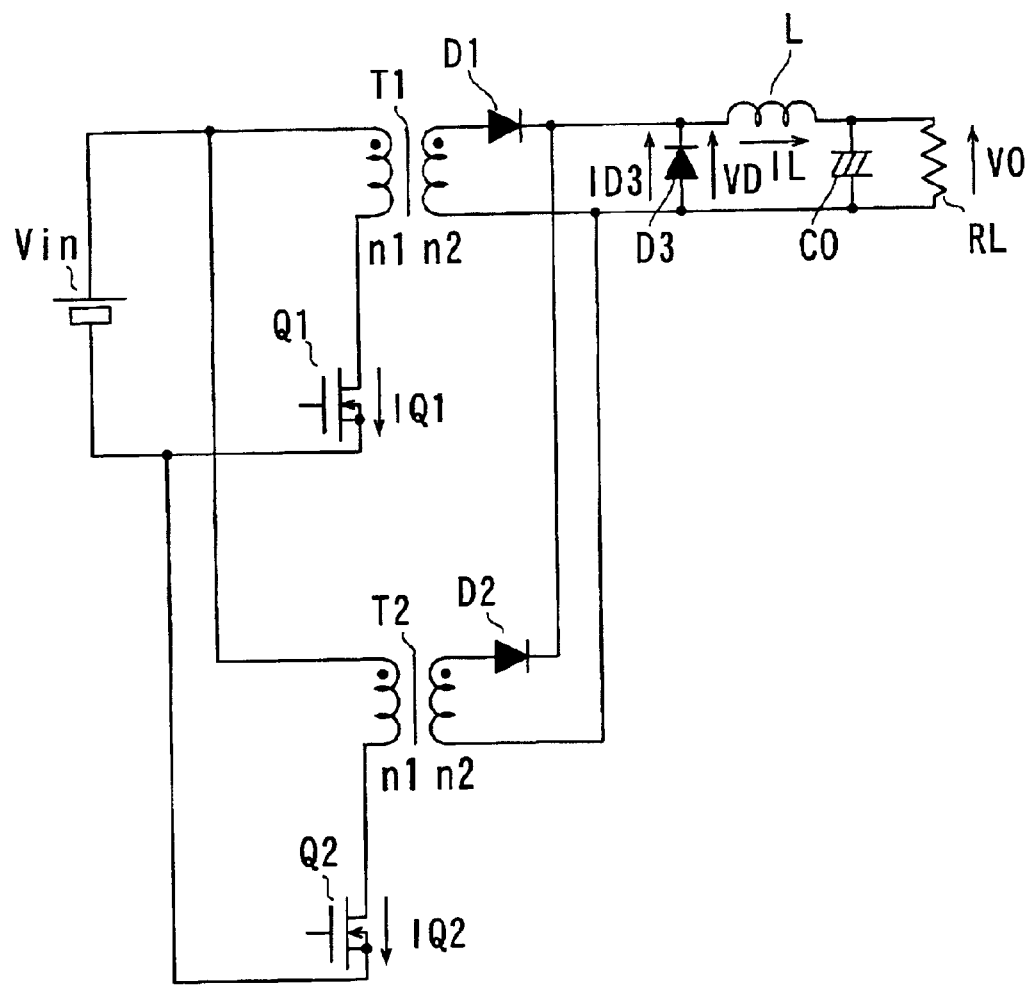
FIG. 13 is a circuit diagram of still another example of the invention.
Figure 14:
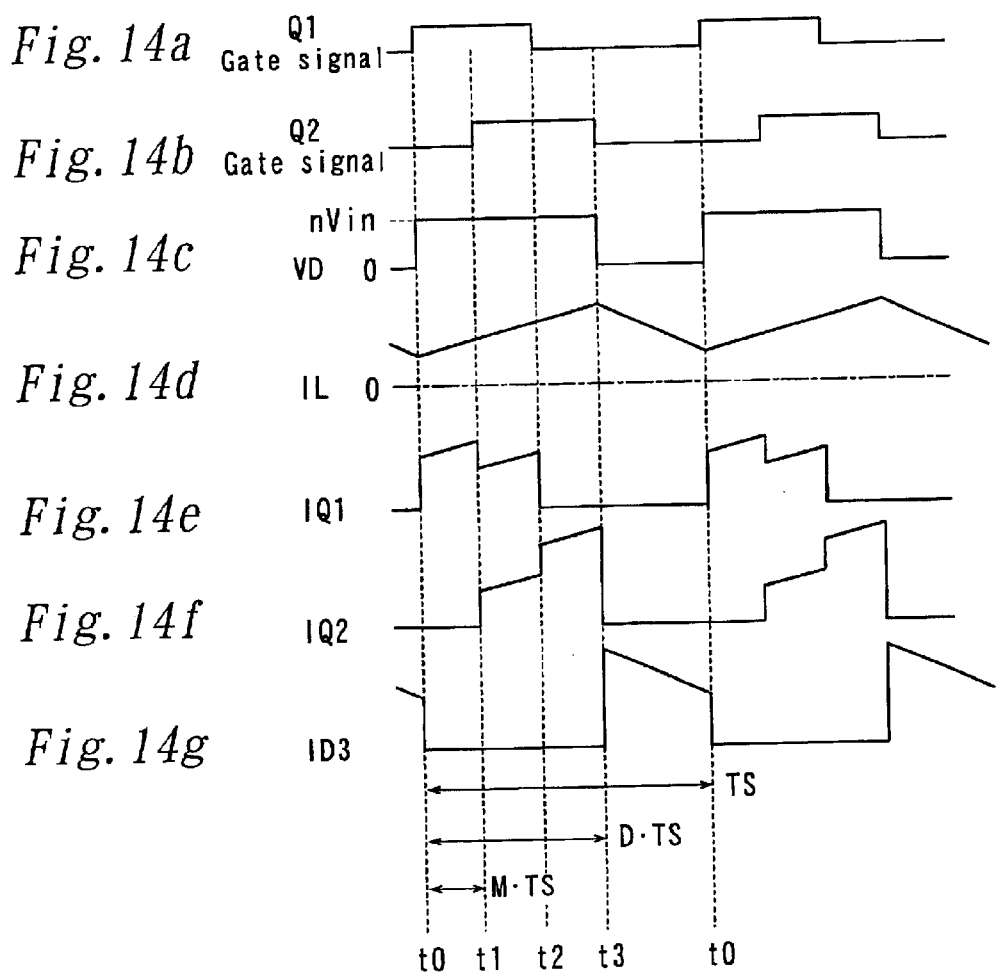
FIG. 14 is a graph illustrating waveforms that appear when the example of FIG. 13 is in operation.

FIG. 13 is a circuit diagram of still another example of the invention realized by applying the present invention to a forward type converter. FIG. 14 is a graph illustrating the waveforms that appear when the example of FIG. 13 is in operation FIGS. 15 through 18 are equivalent circuit diagrams of the example in different modes of operation. Since the operations of these examples are similar to that of the example of FIG. 1, they will not be described any further.

Figure 15:
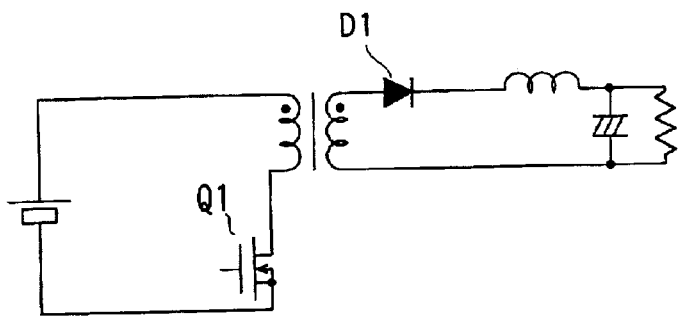
FIG. 15 is an equivalent circuit diagram to be used for illustrating the operation of the example of FIG. 13.
Figure 16:
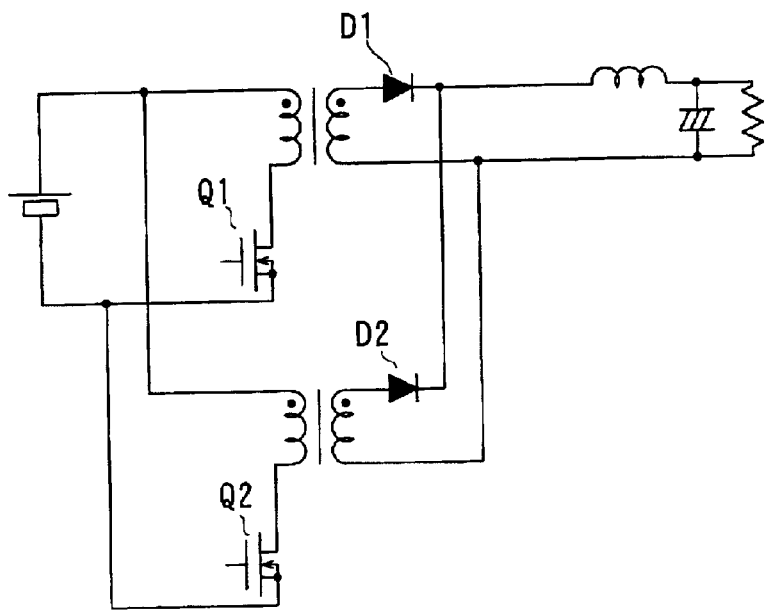
FIG. 16 is an equivalent circuit diagram to be used for illustrating the operation of the example of FIG. 13.
Figure 17:
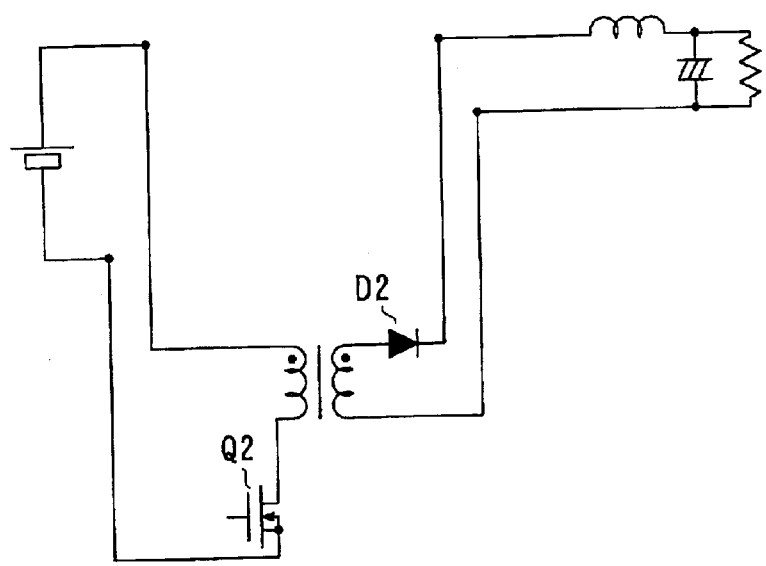
FIG. 17 is an equivalent circuit diagram to be used for illustrating the operation of the example of FIG. 13.
Figure 18:
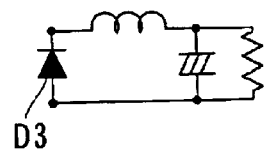
FIG. 18 is an equivalent circuit diagram to be used for illustrating the operation of the example of FIG. 13.

Note that FIG. 15 is an equivalent circuit diagram illustrating the operation of the example in mode 1 (operation of Q1); and FIG. 16 is an equivalent circuit diagram illustrating the operation of the example in mode 2 (parallel operation of Q1, Q2), whereas FIG. 17 is an equivalent circuit diagram illustrating the operation of the example in mode 3 (operation of Q2); and FIG. 18 is an equivalent circuit diagram illustrating the operation of the example in mode 4 (where switches Q1, Q2 are off and diode D3 is in regenerative operation).

The voltage change ratio of the input voltage Vin to the output voltage $V_o$ of the device of FIG. 13 is determined in the following way. If the switching cycle period is Ts, the turn ratio of the primary winding to the secondary winding of each of the transformers T1, T2 is 1:n, the on width of the switch Q1 and that of the switch Q2 are similarly (D·Ts); and the phase difference between the switch Q1 and the switch Q2 is φ (φ=M·Ts in terms of time region, where M is the delay constant), the variation (ΔTon) of the choke current IL being expressed by formula G below when the choke current IL is increasing (in the period from time to t0 time t3).

$$\Delta I Lon = \frac{n \times V\text{in} - Vo}{L}(D+M) \times Ts. \qquad \text{Formula G}$$

The variation (ΔILoff) of the choke current IL is expressed by formula H below when the choke current IL is decreasing (in the period from time t3 to time t0).

$$\Delta I Loff = \frac{Vo}{L}(1-D-M) \times Ts \qquad \text{Formula H}$$

In a steady state, equation (I) below holds true.

$$\frac{n \times V\text{in} - Vo}{L}(D+M)Ts = \frac{Vo}{L}(1-D-M)Ts \qquad \text{Formula I}$$

The equation (I) can be reduced to equation (J) below.

$$\frac{Vo}{V\text{in}} = n(D+M) \qquad \text{Formula J}$$

Since $0 \leq M \leq D$, $$n \times D \leq \frac{Vo}{V\text{in}} \leq 2n \times D. \qquad \text{Formula K}$$

Therefore the relationship between the input voltage Vin and the output voltage $V_o$ can be controlled within the above range. Thus, a power supply device according to the invention that is required to give a performance of FIG. 21 can operate for constant power and constant voltage by using the above described control method.

As described above in detail, a DC power supply device with a constant power output level according to the invention is designed so that its output power is controlled by utilizing the phase difference of its two switching changers that may be connected in series or in parallel for operation or either of which may be isolated for operation. Then, each of its circuit components can be exploited to a great extent. Particularly, the capacities of its transformers can be utilized to 100% by controlling the output power to make it possible to reduce their dimensions. Additionally, the output filter can also be downsized because of the small variation in the output waveform. Thus, it is not necessary to reduce the pulse width of each of the switching elements for constant power output operation. Therefore, the increase in the effective current can be minimized to minimize the power loss of the switching elements and make it possible to downsize the heat sink fins. According to the invention, it is possible to provide a compact power supply device because the above listed components that take a relatively large part of the overall weight of the device can be significantly downsized.

What is claimed is:

1. A power supply device for supplying an output voltage from a smoothing ciruit to a load, comprising:
    a first primary winding and a second primary winding, and a first secondary winding and a second secondary winding magnetically coupled respectively to said first and second primary windings;
    a first current supply circuit and a second current supply ciruit for respectively supplying electric currents to said first and second primary windings and inducing alternating voltages in said first and second secondary windings by making said electric current flow to said first and second primary windings;
    a rectifying circuit for rectifying the respective alternating voltages induced in said first and second secondary windings and being connected to said first and second secondary winding respectively at their ends, said rectifying circuit having a first rectifying element, a second rectifying element, and a third rectifying element, said rectifying elements being commonly connected to first and second connection points, said first and second connection points being connected to said smoothing circuit; and said smoothing circuit for smoothing the voltage output from said rectifying circuit, other ends of said first and second secondary windings being short circuited, said first and second current supply circuits controlling phases of alternating currents supplied to said first and second primary windings respectively, wherein an operation period of said power supply device includes a period where said first and second secondary windings are connected in parallel relative to said rectifying circuit as a function of polarities of the voltages induced in said first and second secondary windings respectively, and said period of said parallel connection is changed by controlling said phases by means of said first and second current supply circuits.

2. The power supply device according to claim 1, wherein an operation period of said power supply device includes a period where said first and second secondary windings are connected in series relative to said rectifying circuit for a period as a function of polarities of the voltages induced in said first and second secondary windings respectively, and said period of said series connection is changed by controlling said phases by means of said first and second current supply circuits.

3. The power supply device according to claim 2, further comprising a measuring circuit for measuring the output voltage and output current supplied to said load and controlling phases of said first and second current supply circuits based on the measurement result.

4. The power supply device according to claim 3, wherein said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

5. The power supply device according to claim 3, wherein said first and second current supply circuits prolong the period of connecting said first and second secondary windings in series by controlling said phases upon detection by said measuring circuit of any decrease in said output voltage, and shorten the period of connecting said first and second secondary windings in series by controlling said phases upon detection by said measuring circuit of any increase in said output voltage.

6. The power supply device according to claim 2, wherein said first and second current supply circuits supply respective electric currents to said first and second primary windings so as to make frequencies of the alternating voltages induced in said first and second secondary windings equal to each other.

7. The power supply device according to claim 1, further comprising a measuring circuit for measuring an output voltage and output current supplied to said load and controlling phases of said first and second current supply circuits based on a measurement result.

8. The power supply device according to claim 7, wherein said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

9. The power supply device according to claim 1, wherein said first and second current supply circuits supply respective electric currents to said first and second primary windings so as to make frequencies of the alternating voltages induced in said first and second secondary windings equal to each other.

10. A power supply device for supplying an output voltage from a smoothing circuit to a load, comprising:

a first primary winding and a second primary winding, and a first secondary winding and a second secondary winding magnetically coupled respectively to said first and second primary windings;

a first current supply circuit and a second current supply circuit for respectively supplying a forwardly flowing electric current and a backwardly flowing electric current to said first and second primary windings and inducing voltages in said first and second secondary windings;

a rectifying circuit for rectifying the respective voltages induced in said first and second secondary windings; and said smoothing circuit for smoothing the voltage output from said rectifying circuit;

said rectifying circuit having a first series connected circuit, a second series connected circuit, and a third series connected circuit, each being formed by connecting two rectifying elements in series at a connection point, said first through third series connected circuits being short circuited respectively at anode sides and cathode sides and connected to said smoothing circuit;

said first and second secondary windings being connected respectively at their ends thereof to connection middle points of said first and second series connected circuits;

said first and second secondary windings being connected respectively to other ends thereof to a connection middle point of said third series connected circuits.

11. The power supply device according to claim 10, wherein each of said two rectifying elements of said first series connected circuit consists of at least two rectifying elements connected in parallel, respectively.

12. The power supply device according to claim 10, wherein an operation period of said power supply device includes periods where said first and second secondary windings are connected in parallel and in series relative to said rectifying circuits respectively as a function of polarities of the voltages induced in said first and second secondary windings respectively, and said periods of said series connection and that of said parallel connection are changed by controlling phases of alternating voltages induced in said first and second secondary windings by means of said first and second current supply circuits.

13. The power supply device according to claim 12, further comprising a measuring circuit for measuring an output voltage and an output current supplied to said load, said first and second current supply circuits controlling said phases based on a measurement result.

14. The power supply device according to claim 12, wherein
said first and second current supply circuits prolong the period of said series connection of the said first and second secondary windings by controlling said phases upon detection by said measuring circuit of any reduction in said output voltage and shorten the period of said series connection of said first and second secondary windings upon detection by said measuring circuit of any increase in said output voltage.

15. The power supply device according to claim 12, wherein
said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

16. The power supply device according to claim 12, wherein
said first and second current supply circuits supply respective electric currents to said first and second primary windings so as to make the frequencies of the alternating voltages induced in said first and second secondary windings equal to each other.

17. A power supply device supplying an output voltage from a smoothing circuit to a load, comprising:
a first primary winding and a second primary winding, and a first secondary winding and a second secondary winding magnetically coupled respectively to said first and second primary windings;
a first current supply circuit and a second current supply circuit for respectively and intermittently supplying electric currents to said first and second primary windings and inducing voltages in said first and second secondary windings;
a rectifying circuit for rectifying respective voltages induced in said first and second primary windings; and
said smoothing circuit for smoothing the voltage output from said rectifying circuit, the smoothing circuit being connected to a first common connection point and a second common connection point included in said rectifying circuit,
said rectifying circuit having a first rectifying element, a second rectifying element, and a third rectifying element, said rectifying elements being commonly connected to first and second connection points, said first and second connection points being connected to said smoothing circuit,
said first and second secondary windings being connected respectively at their ends thereof to said first common connection point by way of said first and second rectifying elements;
said first and second secondary windings being connected respectively to other ends thereof to said second common connection point, said second common connection point being connected to said first common connection point by way of said third rectifying element,
wherein an operation period of said power supply device includes a period where said first and second secondary windings are connected in parallel relative to said rectifying circuit as a function of polarities of the voltages induced in said first and second secondary windings respectively, and
said period of said parallel connection is changed by controlling said phases of the alternating voltages induced in said first and second secondary windings by means of said first and second current supply circuits.

18. The power supply device according to claim 17, further comprising a measuring circuit for measuring an output voltage and an output current supplied to said load, said first and second current supply circuits controlling said phases based on the measurement result.

19. The power supply device according to claim 18, wherein
said measuring circuit prolongs the period of connecting said first and second secondary windings in parallel by controlling said phases of said first and second current supply circuits upon detecting any increase exceeding a predetermined upper limit in said output current, and shortens the period of connecting said first and second secondary windings in parallel by controlling said phases of said first and second current supply circuits upon detecting any decrease from said upper limit in said output current.

20. The power supply device according to claim 12, wherein said first and second current supply circuits supply respective electric currents to said first and second primary windings so as to make the frequencies of the alternating voltages induced in said first and second secondary windings equal to each other.

* * * * *